(12) United States Patent
Chirra et al.

(10) Patent No.: US 8,555,369 B2
(45) Date of Patent: Oct. 8, 2013

(54) SECURE FIREWALL RULE FORMULATION

(75) Inventors: Radhika Chirra, Cedar Park, TX (US); Nikhil Hegde, Round Rock, TX (US); Richard J. Knight, Cedar Park, TX (US); Rashmi Narasimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/269,897

(22) Filed: Oct. 10, 2011

(65) Prior Publication Data

US 2013/0091538 A1   Apr. 11, 2013

(51) Int. Cl.
    *H04L 29/06* (2006.01)
(52) U.S. Cl.
    USPC .................................. 726/11; 726/1; 726/29
(58) Field of Classification Search
    USPC .................................................. 726/1, 11, 29
    See application file for complete search history.

(56) References Cited

U.S. PATENT DOCUMENTS

| | | | |
|---|---|---|---|
| 5,828,833 A | 10/1998 | Belville et al. | |
| 5,987,611 A | 11/1999 | Freund | |
| 6,041,355 A | 3/2000 | Toga | |
| 6,219,709 B1 | 4/2001 | Byford | |
| 6,611,869 B1 | 8/2003 | Eschelbeck et al. | |
| 6,832,256 B1 | 12/2004 | Toga | |
| 2004/0168173 A1* | 8/2004 | Cohen et al. | 719/310 |
| 2005/0182958 A1* | 8/2005 | Pham et al. | 713/200 |
| 2007/0133520 A1 | 6/2007 | Kakivaya et al. | |
| 2007/0192847 A1 | 8/2007 | Yeom | |
| 2008/0148380 A1* | 6/2008 | Abzarian et al. | 726/11 |
| 2008/0148384 A1* | 6/2008 | Adhikari et al. | 726/13 |
| 2008/0262991 A1 | 10/2008 | Kapoor et al. | |
| 2009/0089579 A1* | 4/2009 | Murase et al. | 713/164 |
| 2009/0228972 A1* | 9/2009 | Bandi et al. | 726/14 |
| 2010/0095367 A1 | 4/2010 | Narayanaswamy | |
| 2011/0047542 A1* | 2/2011 | Dang et al. | 718/1 |
| 2011/0125799 A1* | 5/2011 | Kandasamy et al. | 707/785 |

FOREIGN PATENT DOCUMENTS

| | | |
|---|---|---|
| CN | 101124801 | 2/2008 |
| WO | 2004070547 | 8/2004 |
| WO | 2007072245 | 6/2007 |

\* cited by examiner

*Primary Examiner* — Michael Pyzocha
(74) *Attorney, Agent, or Firm* — DeLizio Gilliam, PLLC

(57) ABSTRACT

A kernel extension is configured to intercept a call to associate a socket with a port of a node in a network. The call originates from a kernel of the node. The kernel extension is configured to determine the port from the call. The kernel extension is configured to determine that the port is one of a plurality of ports for which the node has authority to modify firewall rules of a firewall of the network. The kernel extension is configured to modify firewall rules maintained by the firewall to allow communications for the port to the node through the firewall.

20 Claims, 5 Drawing Sheets

SECURE FIREWALL RULE FORMULATION

BACKGROUND

Embodiments of the inventive subject matter generally relate to the field of computer security, and, more particularly, to dynamically establishing firewall rules.

Firewalls inspect network traffic, and selectively allow or restrict connections on certain nodes in a network. The firewall inspects the network traffic in accordance with static firewall rules configured for different nodes on the network and/or applications running on the different nodes. When requirements for the network change, a network administrator logs into the firewall and configures the firewall rules to accommodate the change.

SUMMARY

Embodiments of the inventive subject matter include a method for nodes of a network to formulate firewall rules. The method intercepts a call to associate a socket with a port of a node in a network. The call originates from a kernel of the node. The method determines the port from the call. The method determines that the port is one of a plurality of ports for which the node has authority to modify firewall rules of a firewall of the network. The method modifies the firewall rules to allow communications for the port to the node through the firewall.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a firewall control kernel extension physically residing on a server, embodiments do not necessarily require the firewall control kernel extension to physically reside on a server. In other instances, well-known instruction instances, protocols, structures and techniques have not been shown in detail in order not to obfuscate the description.

A firewall control kernel extension allows a node in a network to formulate rules for a firewall that protects the network. The firewall control kernel extension formulates the rules based on awareness of application activity and port utilization at a node associated with the firewall control kernel extension. The firewall control kernel extension maintains a controlled ports list and an open ports list. The controlled ports list indicates ports (e.g., by port number) for which the firewall control kernel extension can configure firewall rules at the firewall. A network administrator can configure the controlled ports list. The open ports list indicates open ports of the node being monitored by the firewall control kernel extension. The firewall control kernel extension intercepts socket bind and socket close calls (hereinafter "socket calls") in a kernel, and determines port numbers referred to in the socket calls. The firewall control kernel extension compares port numbers of intercepted socket calls against the controlled ports list. If a port number is found in the controlled ports list, the firewall control kernel extension formulates a firewall rule change command to allow communication for the port through the firewall. After receiving an acknowledgement that the firewall rule change command has been implemented, the firewall control kernel extension updates the open ports list to indicate the port. If the firewall rule change command corresponds to opening a port, the port is added to the open ports list. If the firewall rule change command corresponds to closing a port, the port is removed from the open ports list.

Figure 1:
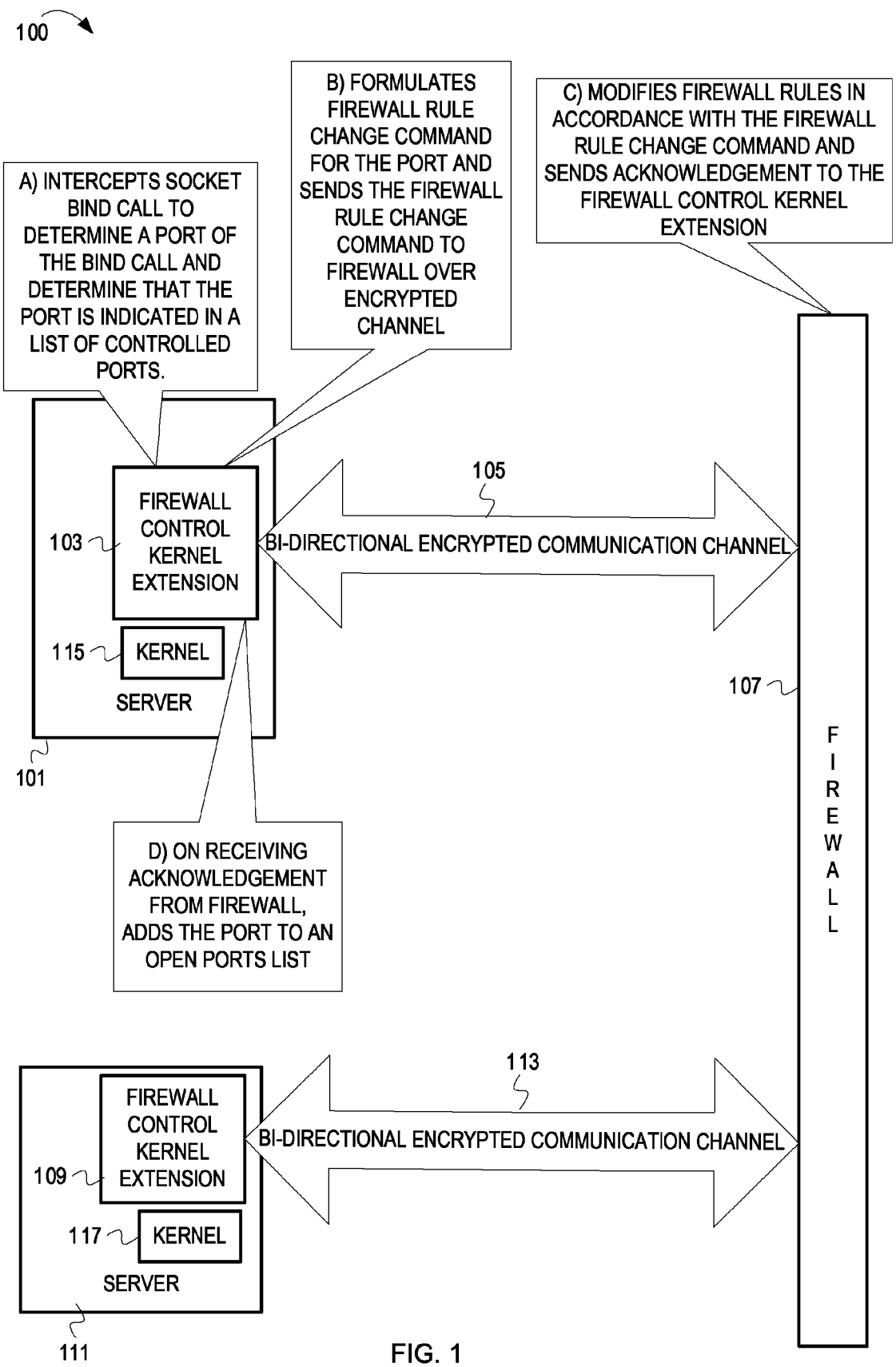
FIG. 1 depicts a concept diagram of a firewall control kernel extension dynamically changing rules at a firewall.

FIG. 1 depicts a concept diagram of a firewall control kernel extension dynamically changing rules at a firewall. FIG. 1 depicts a network system 100 with multiple entities including a server 101, a server 111, and a firewall 107. The server 101 hosts a firewall control kernel extension 103 and a kernel 115. FIG. 1 depicts the server 101 as communicatively coupled to the firewall 107 via a bi-directional encrypted communication channel 105. The server 111 hosts a firewall control kernel extension 109 and a kernel 117. FIG. 1 depicts the server 111 as communicatively coupled with the firewall 107 via a bi-directional encrypted communication channel 113. The bi-directional encrypted communication channels can be established in accordance with various techniques. For instance, the bi-directional encrypted communication channel 105 is established between the server 101 and the firewall 107 using a combination of private keys present on the server 101 and the firewall 107. Similarly, the bi-directional encrypted communication channel 113 is established between the server 111 and the firewall 107 using a combination of private keys present on the server 111 and the firewall 107. FIG. 1 depicts interaction between the firewall control kernel extension 103 and the firewall 107 with a sequence of stages A through D. Similar interaction can occur between the server 111, or other server(s) and the firewall 107 in the network system 100.

At stage A, the firewall control kernel extension 103 intercepts a socket bind call from the kernel 115 of the server 101. The firewall control kernel extension 103 determines a port indicated in the socket bind call, and determines that the port is indicated in a controlled ports list.

At stage B, the firewall control kernel extension 103 formulates a firewall rule change command for the port since the port is indicated in the controlled ports list. The firewall rule change command instructs the firewall to update a firewall rules table. The firewall control kernel extension 103 sends the firewall rule change command over the bi-directional encrypted communication channel 105 to the firewall 107. Since the intercepted call was a socket bind call, the firewall control kernel extension 103 formulates the firewall rule change command to allow communications for the port through the firewall 107. Embodiments can modify a firewall responsive to a kernel system call with different techniques. In some embodiments, the firewall control kernel extension 103 hooks directly into the firewall 107 to modify the firewall rules.

At stage C, the firewall 107 executes the firewall rule change command received from the firewall control kernel extension 103. The firewall 107 updates firewall rules to allow communication for the port through the firewall 107 in accordance with the firewall rule change command. After the firewall rule change command is successfully executed, the firewall 107 sends an acknowledgment to the firewall control kernel extension 103. Acknowledgments are sent over the bi-directional encrypted communication channel 105.

At stage D, the firewall control kernel extension 103 updates an open ports list on receiving the acknowledgement from the firewall 107. If the acknowledgement is received by the firewall control kernel extension within a specified time period (hereinafter as "time-out period"), the firewall control kernel extension 103 adds the port to the open ports list. The time-out period can be defined by a network administrator.

For a socket close call, similar stages as represented in FIG. 1 can be performed. For a socket close call, the firewall rule change command will instruct the firewall 107 to either block communications for the port on the corresponding server or remove an allow rule for the port on the server. On receiving an acknowledgement for successful execution of the firewall rule change command, the firewall control kernel extension 103 removes the port from the open ports list.

Figure 2:
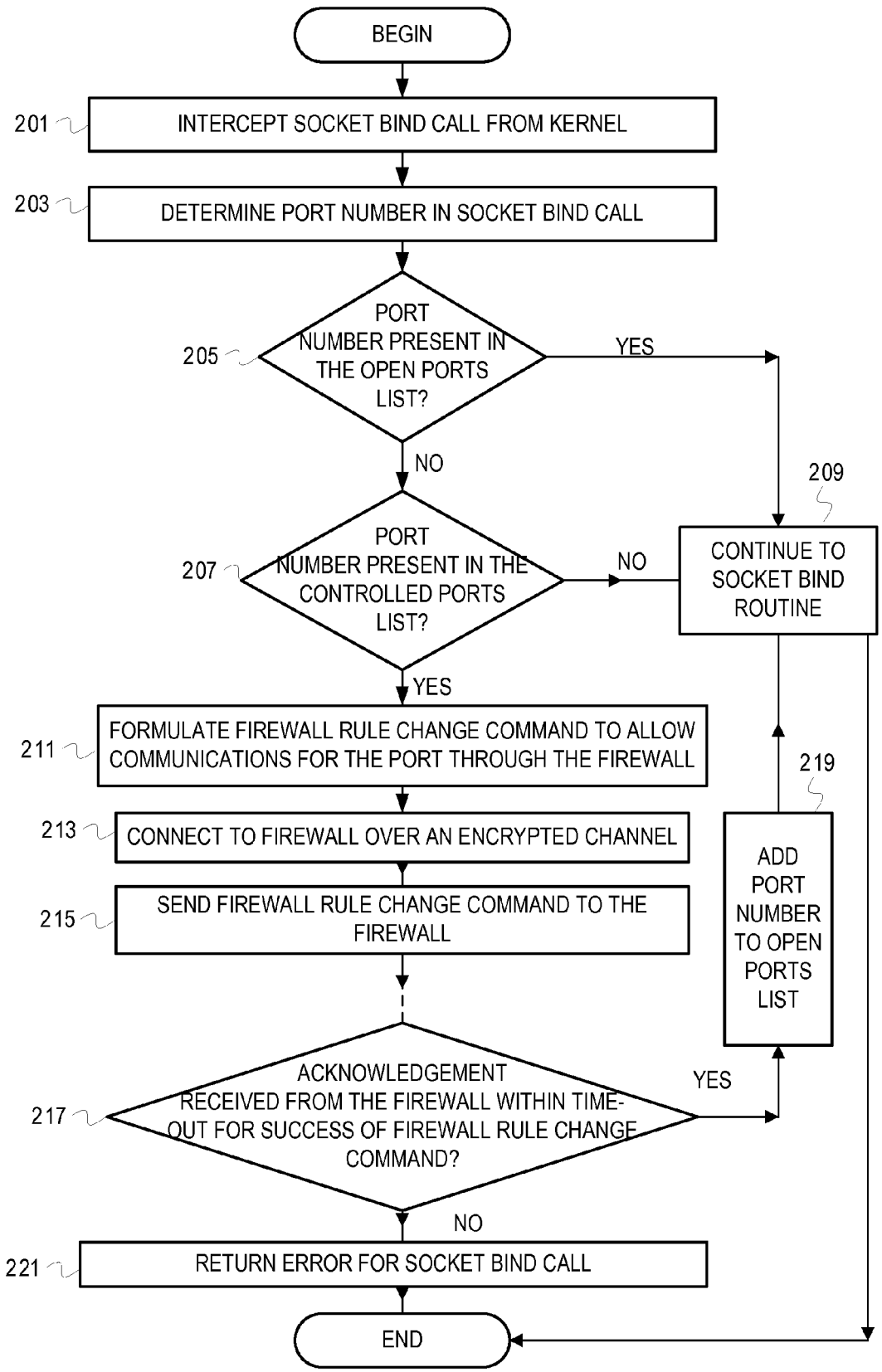
FIG. 2 illustrates a flow diagram of example operations to establish an allow communication rule at a firewall from a kernel extension.
Figure 3:
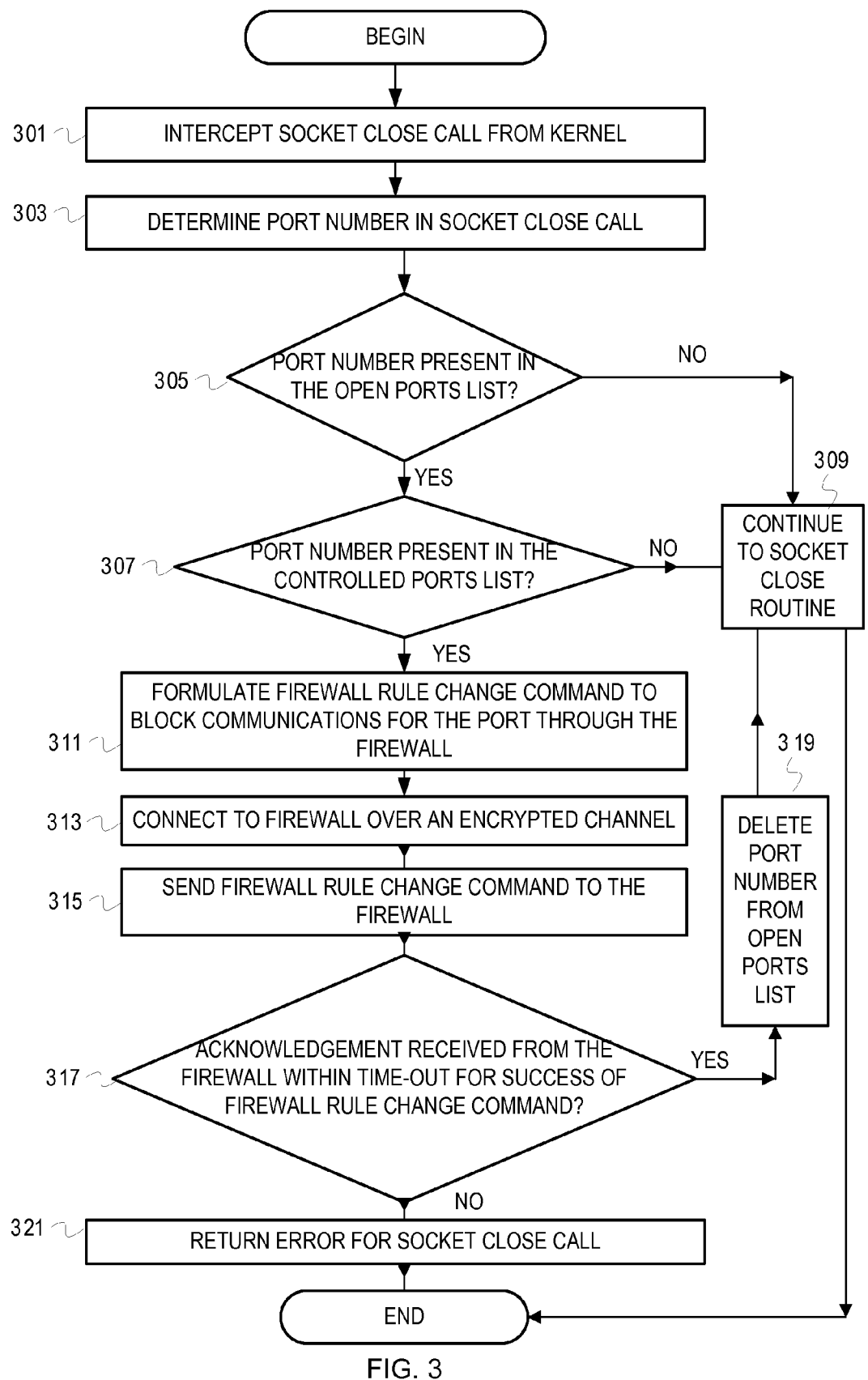
FIG. 3 illustrates a flow diagram of example operations to establish a block communication rule at a firewall from a kernel extension.

FIGS. 2 and 3 depict flowcharts of example operations for formulating firewall rule change commands for a socket bind call and a socket close call, respectively.

FIG. 2 illustrates a flow diagram of example operations to establish an allow communication rule at a firewall from a firewall control kernel extension.

At block 201, a firewall control kernel extension intercepts a socket bind call from a kernel. The firewall control kernel extension modifies a system call table in the server to redirect system socket bind calls to the firewall control kernel extension. The firewall control kernel extension renames the system calls for binding a socket to redirect to the firewall control kernel extension. The firewall control kernel extension reads the redirected calls, and processes the data of the call. After processing, the firewall control kernel extension invokes the system code for the system bind call.

At block 203, the firewall control kernel extension reads the socket bind call to determine a port number in the socket bind call. The port number indicates a port for an application to communicate.

At block 205, the firewall control kernel extension determines if the port number is present in an open ports list. Presence of the port number in the open ports list indicates that the port is already open. If the port number is present in the open ports list, then control flows to block 209. If the port number is not present in the open ports list, then control flows to block 207.

At block 207, the firewall control kernel extension determines if the port number is present in a controlled ports list. Presence of the port number in the controlled ports list indicates that the port can be controlled by the firewall control kernel extension. If the port number is present in the controlled ports list, then control flows to block 211. If the port number is not present in the controlled ports list, then control flows to block 209.

At block 211, the firewall control kernel extension formulates a firewall rule change command for communications on the port to be allowed through the firewall. The firewall rule change command instructs the firewall to add a rule to allow communications on the port of the corresponding server.

At block 213, the firewall control kernel extension connects to the firewall over an encrypted channel.

At block 215, the firewall control kernel extension sends the firewall rule change command, formulated at block 211, to the firewall over the encrypted channel.

At block 217, the firewall control kernel extension determines if an acknowledgement is received from the firewall within a time-out period. An acknowledgement from the firewall indicates successful execution of the firewall rule change command. If an acknowledgement is received within the time-out period, control flows to block 219. If an acknowledgement is not received within the time-out period, control flows to block 221.

At block 219, the firewall control kernel extension adds the port number to the open ports list.

At block 209, the firewall control kernel extension continues to a socket bind routine. The socket bind routine executes socket listen and socket accept calls in the kernel.

At block 221, the firewall control kernel extension returns an error for the socket bind call. In some embodiments, the firewall control kernel extension can present a notification that the firewall rule change command was not executed at the firewall. The firewall control kernel extension can also present a notification that the firewall rule change command was not executed within a time-out period. In some embodiments, a log is updated to indicate that the firewall rule change command failed.

FIG. 3 illustrates a flow diagram of example operations to establish a block communication rule at a firewall from a kernel extension.

At block 301, the firewall control kernel extension intercepts a socket close call from the kernel. The firewall control kernel extension modifies a system call table in the server to redirect system calls to the firewall control kernel extension. The firewall control kernel extension renames the system calls for closing a socket to redirect to the firewall control kernel extension. The firewall control kernel extension reads the redirected calls, and processes the data of the call. After processing, the firewall control kernel extension invokes the system code for the socket close call.

At block 303, the firewall control kernel extension reads the socket close call to determine a port number in the socket close call. The port number indicates a port for an application to stop communication.

At block 305, the firewall control kernel extension determines if the port number is present in an open ports list. Presence of the port number in the open ports list indicates that the port is open for communication. If the port number is present in the open ports list, then control flows to block 307. If the port number is not present in the open ports list, then control flows to block 309.

At block 307, the firewall control kernel extension determines if the port number is present in a controlled ports list. Presence of the port number in the controlled ports list indicates that the port can be controlled by the firewall control kernel extension. If the port number is present in the controlled ports list, control flows to block 311. If the port number is not present in the controlled ports list, control flows to block 309.

At block 311, the firewall control kernel extension formulates a firewall rule change command to block communications for the port through the firewall. The firewall rule change command instructs the firewall to add a block communication rule to block communications for the port of the corresponding server.

At block 313, the firewall control kernel extension connects to the firewall over an encrypted channel.

At block 315, the firewall control kernel extension sends the firewall rule change command, formulated at block 311, to the firewall over the encrypted channel.

At block 317, the firewall control kernel extension checks if an acknowledgement is received from the firewall within a time-out period. An acknowledgement from the firewall indicates successful execution of the firewall rule change command. If an acknowledgement is received within the time-out period, control flows to block 319. If an acknowledgement is not received within the time-out period, control flows to block 321.

At block 319, the firewall control kernel extension deletes the port number from the open ports list.

At block 309, the firewall control kernel extension allows a socket close routine to continue. The socket close routine releases resources allocated for the socket connection.

At block 321, the firewall control kernel extension returns an error for the socket close call. In some embodiments, the firewall control kernel extension can present a notification that the firewall rule change command was not executed at the firewall. The firewall control kernel extension can also present a notification that the firewall rule change command was not executed within a time-out period.

Those of ordinary skill in the art should understand that the depicted flowcharts are examples to aid in understanding the inventive subject matter, and should not be used to limit the scope of the claims. Embodiments can perform additional operations not depicted, fewer than the depicted operations, the operations in a different order, the operations in parallel, etc. For example, a firewall control kernel extension can determine whether a port number is present in the open ports list after or in parallel with determine whether the port number is present in the controlled ports list. Although not illustrated in the flow diagrams, the firewall control kernel extension can remotely configure the firewall in some embodiments. The firewall control kernel extension can invoke a remote procedure call of a firewall function to modify firewall rules at the firewall.

In some embodiments, the firewall control kernel extension can maintain a log of port open and port close actions over a period of time. The log can be used to build intelligence into the firewall control kernel extension to open or close certain ports at a certain time. Information about ports opened and ports controllable by the firewall control kernel extension can be maintained as a lists or other data structures including arrays, linked lists etc. The firewall control kernel extension can communicate firewall rule change commands as an individual command or a batch of commands or both. The firewall control kernel extension can also receive acknowledgements from the firewall as an individual acknowledgement, a batch of acknowledgements or both. The firewall control kernel extension can make one change or multiple changes in the open ports list at the same time. The bi-directional encrypted communication channel can be implemented as a direct secure shell connection. In some embodiments, the bi-directional encrypted communication channel can be implemented with all trusted hosts presenting connections to the firewall or all trusted hosts and the firewall joining a secure multicast group.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
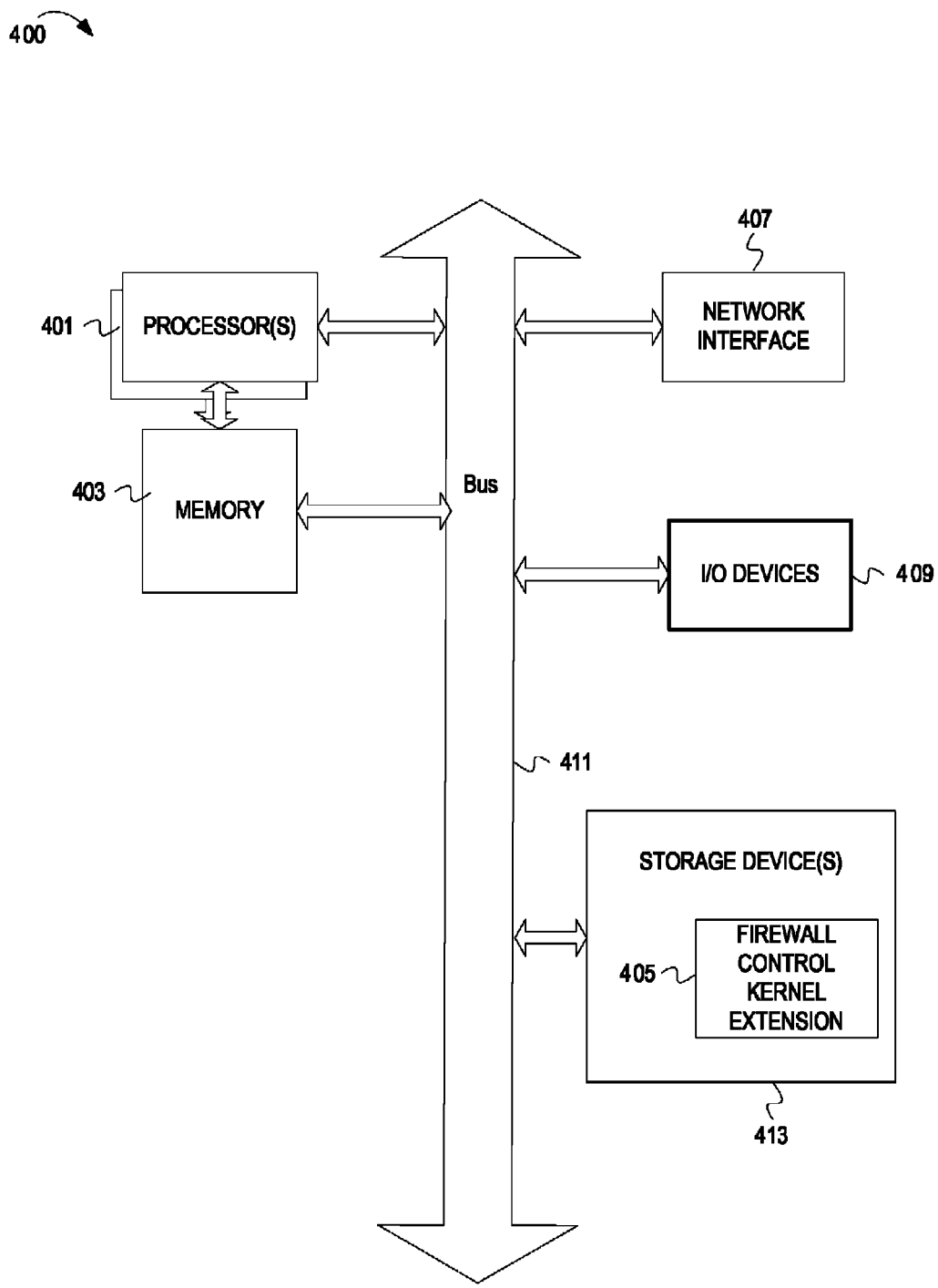
FIG. 4 depicts an example computer system.

FIG. 4 depicts an example computer system. A computer system 400 includes a processor unit 401 (possibly including multiple processors, multiple cores, multiple nodes, and/or implementing multi-threading, etc.). The computer system includes a memory 403. The memory 403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 411 (e.g., PCI, ISA, PCI-Express, HyperTransport®, InfiniBand®, NuBus, etc.), a network interface 407 (e.g., an ATM interface, an Ethernet interface, a Frame Relay interface, SONET interface, wireless interface, etc.), I/O devices 409, a storage device(s) 413 (e.g., optical storage, magnetic storage, etc.). A firewall control kernel extension 405 is embodied in the storage device(s) 413. The firewall control kernel extension 405 may be encoded into the memory 403 or may reside in any other storage media (e.g., ROM, Flash memory etc.) accessible by the processor. Further, realizations may include fewer or additional components not illustrated in FIG. 4 (e.g., video cards, audio cards, additional network interfaces, peripheral devices, etc.). The processor unit 401, the I/O devices 409, the storage device(s) 413, and the network interface 407 are coupled to the bus 411. Although illustrated as being coupled to the bus 411, the memory 403 may be coupled to the processor unit 401.

Figure 5:
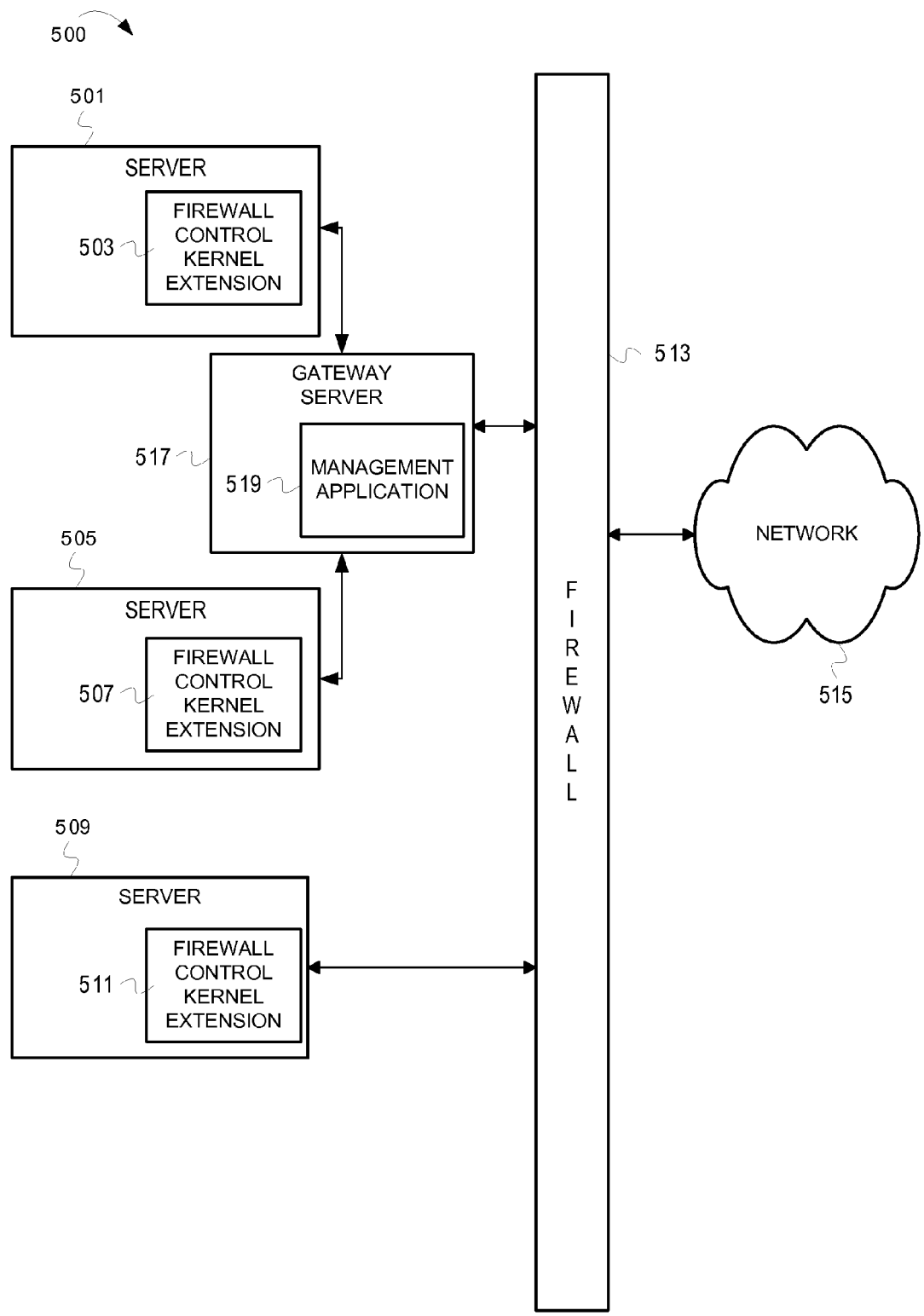
FIG. 5 depicts an example network system.

FIG. 5 depicts an example network system. The network system 500 includes a server 501, a server 505, a gateway server 517, a server 509, a firewall 513 and a network 515. A firewall control kernel extension 503 resides at the server 501 and formulates firewall rule change commands for the server 501. Similar function is performed by a firewall control kernel extension 507 residing at the server 505, and by a firewall control kernel extension 511 residing at the server 509. The gateway server 517 aggregates firewall rule change commands from a homogenous section of the network system 500 and communicates the firewall rule change commands to the firewall 513. The homogenous section is likely to have the same set of ports to be opened for communication. In the network system 500, the server 501 and the server 505 constitute a homogenous section. A management application 519 resides at the gateway server 517, and contains the program code to aggregate firewall rule change commands from the server 501 and the server 505. The gateway server 517, and the server 509 interface with the firewall using secure channels of communication. The firewall 513 contains, but is not necessarily limited to, a firewall rules and program code for implementing the rules. The firewall 513 may be embodied in hardware or software and can reside as a standalone unit, on a computer device (e.g., personal computer, server etc.) or a network device (e.g. router, switch etc.). The network 515 represents a computer network (e.g. LAN, MAN, WAN, WiFi, WiMax etc.).

While the embodiments are described with reference to various implementations and exploitations, it will be understood that these embodiments are illustrative and that the scope of the inventive subject matter is not limited to them. In general, techniques for the firewall control kernel extension as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   intercepting a call, by a kernel extension of a kernel of a node, for a firewall to associate a socket with a port of the node in a network, wherein the call originates from the kernel of the node;
   determining the port from the call;
   determining that the port is one of a plurality of ports for which the kernel extension has authority to modify firewall rules of the firewall of the network; and
   responsive to said determining that the port is one of the plurality of ports for which the kernel extension has authority to modify firewall rules, modifying, by the kernel extension, firewall rules maintained by the firewall to allow communications for the port to the node through the firewall.

2. The method of claim 1, wherein said modifying the firewall rules maintained by the firewall comprises one of:
   creating, by the kernel extension, a command to modify the firewall rules and sending the command to the firewall; and
   invoking, by the kernel extension, a remote procedure call that modifies the firewall rules at the firewall.

3. The method of claim 2 further comprising establishing a secure communication channel between the node and the firewall, wherein the node sends the commands or invokes the remote procedure calls to the firewall via the secure communication channel.

4. The method of claim 1 further comprising:
   receiving an acknowledgement from the firewall that the firewall was successfully modified;
   responsive to receiving the acknowledgement, indicating that communications are allowed through the firewall for the port; and allowing the call to associate the port with the socket to complete.

5. The method of claim 4, wherein said allowing the call to associate the port with the socket to complete comprises invoking kernel code for associating the port with the socket, wherein said intercepting the call to associate the socket with the port of the node comprises invoking the kernel extension code instead of the kernel code for associating the port with the socket when the kernel receives the call.

6. The method of claim 1 further comprising generating a notification that the call to associate the socket with the port cannot be completed responsive to a timeout period expiring without receiving an acknowledgement of modifying the firewall rules maintained by the firewall was successful.

7. The method of claim 1 further comprising:
intercepting a call to release the socket associated with the port;
determining the port from the call to release the socket;
determining that the port is one of a plurality of ports for which the node has authority to modify firewall rules of the firewall of the network;
determining that communications for the port on the node are currently allowed through the firewall;
modifying the firewall rules maintained by the firewall to block communications for the port to the node through the firewall.

8. A computer program product for secure firewall rule formulation, the computer program product comprising:
a non-transitory computer readable storage medium having computer usable program code embodied therewith, the computer usable program code comprising a kernel extension code configured to:
intercept a call to associate a socket with a port of a node in a network, wherein the call originates from a kernel of the node;
determine the port from the call;
determine whether the port is one of a plurality of open ports monitored by an instance of the kernel extension code;
allow the kernel to associate the socket with the port if the port is one of the plurality of open ports;
determine whether the port is one of a plurality of ports for which the kernel extension code has authority to modify firewall rules of a firewall of the network if the port is not one of the plurality of open ports; and
modify the firewall rules maintained by the firewall to allow communications for the port to the node through the firewall if the port is one of the plurality of ports for which the kernel extension has authority to modify firewall rules.

9. The non-transitory computer readable storage medium of claim 8, wherein the kernel extension code configured to modify the firewall rules maintained by the firewall to allow communication for the port to the node through the firewall if the port is one of the plurality of ports for which the kernel extension has authority to modify firewall rules comprises the kernel extension code configured to, one of:
create a command to modify the firewall rules and send the command to the firewall; and
invoke a remote procedure call that modifies the firewall rules at the firewall.

10. The non-transitory computer readable storage medium of claim 9, wherein the kernel extension code is further configured to establish a secure communication channel between the node and the firewall for the command or the remote procedure call.

11. The non-transitory computer readable storage medium of claim 8, wherein the kernel extension code is further configured to:
receive an acknowledgement from the firewall that the firewall was successfully modified;
responsive to receiving the acknowledgement, indicate that communications are allowed through the firewall for the port; and
allow the call to associate the port with the socket to complete.

12. The non-transitory computer readable storage medium of claim 11, wherein the kernel extension code configured to allow the call to associate the port with the socket to complete comprises the kernel extension code configured to invoke kernel code for associating the port with the socket, wherein the kernel extension code configured to intercept the call to associate the socket with the port of the node comprises the kernel extension code configured to modify a systems call table to invoke the kernel extension code instead of the kernel code for associating the port with the socket when the kernel receives the call to associate the port with the socket.

13. The non-transitory computer readable storage medium of claim 8, wherein the kernel extension code is further configured to generate a notification that the call to associate the socket with the port cannot be completed responsive to a timeout period expiring without receiving an acknowledgement of modifying the firewall rules maintained by the firewall was successful.

14. The non-transitory computer readable storage medium of claim 8, wherein the kernel extension code is further configured to:
intercept a call to release the socket associated with the port;
determine the port from the call to release the socket;
determine that the port is one of a plurality of ports for which the node has authority to modify firewall rules of the firewall of the network;
determine that communications for the port on the node are currently allowed through the firewall; and
modify the firewall rules maintained by the firewall to block communications for the port to the node through the firewall.

15. An apparatus comprising:
a processor;
a network interface coupled with the processor; and
a computer readable storage medium having computer usable program code embodied therewith, the computer usable program code comprising a kernel extension code configured to:
intercept a call to associate a socket with a port of a node in a network, wherein the call originates from a kernel of the node;
determine the port from the call;
determine whether the port is one of a plurality of open ports monitored by an instance of the kernel extension code;
allow the kernel to associate the socket with the port if the port is one of the plurality of open ports;
determine whether the port is one of a plurality of ports for which the kernel extension code has authority to modify firewall rules of a firewall of the network if the port is not one of the plurality of open ports; and
modify the firewall rules maintained by the firewall to allow communications for the port to the node through the firewall if the port is one of the plurality of ports for which the kernel extension has authority to modify firewall rules.

16. The apparatus of claim 15, wherein the kernel extension code is further configured to establish a secure communication channel between the node and the firewall.

17. The apparatus of claim 15, wherein the kernel extension code is further configured to:
receive an acknowledgement from the firewall that the firewall was successfully modified;
responsive to receiving the acknowledgement, indicate that communications are allowed through the firewall for the port; and
allow the call to associate the port with the socket to complete.

18. The apparatus of claim 17, wherein the kernel extension code configured to allow the call to associate the port with the socket to complete comprises the kernel extension code configured to invoke kernel code for associating the port with the socket, wherein the kernel extension code configured to intercept the call to associate the socket with the port of the node comprises the kernel extension code configured to modify a systems call table to invoke the kernel extension code instead of the kernel code for associating the port with the socket when the kernel receives the call to associate the port with the socket.

19. The apparatus of claim 15, wherein the kernel extension code is further configured to generate a notification that the call to associate the socket with the port cannot be completed responsive to a timeout period expiring without receiving an acknowledgement of modifying the firewall rules maintained by the firewall was successful.

20. The apparatus of claim 15 wherein the kernel extension code is further configured to:
intercept a call to release the socket associated with the port;
determine the port from the call to release the socket;
determine that the port is one of a plurality of ports for which the node has authority to modify firewall rules of the firewall of the network;
determine that communications for the port on the node are currently allowed through the firewall; and
modify the firewall rules maintained by the firewall to block communications for the port to the node through the firewall.

* * * * *